(No Model.)
W. W. CAREY.
RING OILER BEARING.
No. 528,714. Patented Nov. 6, 1894.
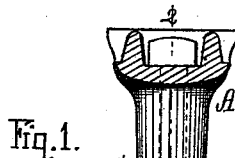
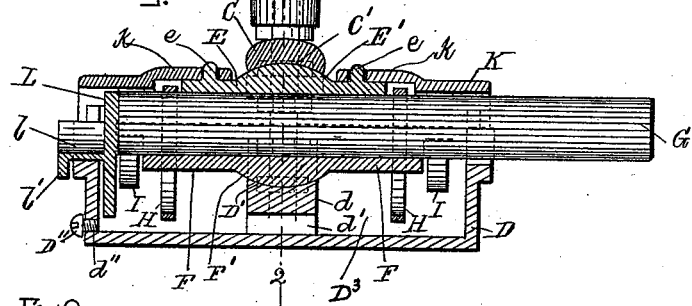
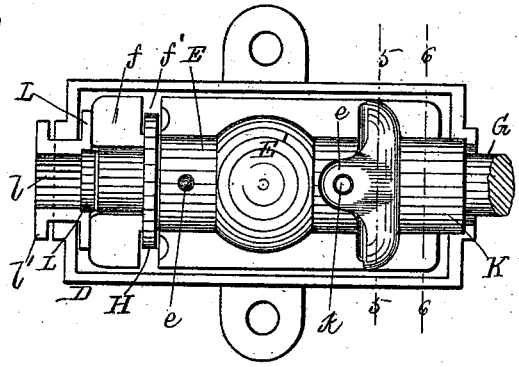
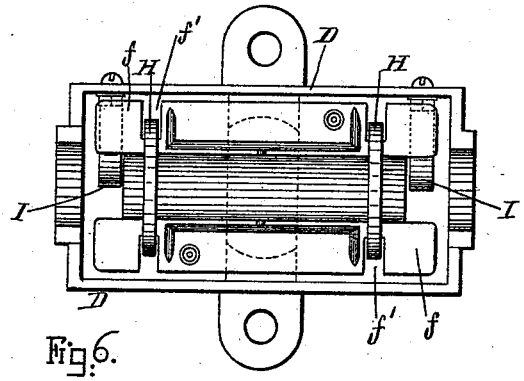
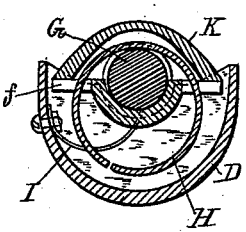
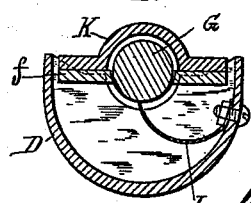
Witnesses.
Lauritz N. Möller.
Kittie M. Hanson.
Inventor
Wilson W. Carey.
by Van Andrew his atty.

UNITED STATES PATENT OFFICE.

WILSON W. CAREY, OF LOWELL, MASSACHUSETTS.

RING-OILER BEARING.

SPECIFICATION forming part of Letters Patent No. 528,714, dated November 6, 1894.

Application filed March 24, 1894. Serial No. 504,932. (No model.)

*To all whom it may concern:*

Be it known that I, WILSON W. CAREY, a citizen of the United States, and a resident of Lowell, in the county of Middlesex and State of Massachusetts, have invented new and useful Improvements in Ring-Oiler Bearings, of which the following, taken in connection with the accompanying drawings, is a specification.

This invention relates to improvements in ring oiler bearings and it is carried out as follows, reference being had to the accompanying drawings, wherein—

Figure 1, represents a central longitudinal section of the improved ring oiler bearing. Fig. 2, represents a cross section on the line 2—2 shown in Fig. 1. Fig. 3, represents a top plan view of the device showing the standard or hanger, the yoke and one of the end caps removed. Fig. 4, represents a detail plan view of the oil chamber and lower bearing. Fig. 5, represents a cross section on the line 5—5 shown in Fig. 3; and Fig. 6, represents a cross section on the line 6—6 also shown in Fig. 3.

Similar letters refer to similar parts wherever they occur on the different parts of the drawings.

A, represents the hanger, or floor stand, adapted to be suspended from the ceiling or wall or secured to the floor as the case may be and in perforations therein are secured the bolts B, B, the lower ends of which are screw threaded as is common in devices of this kind. To the screw threaded bolts B, B, is adjustably secured by means of nuts $b$, $b$, the upper yoke C, having a spherical concavity C', on its under side as shown in Figs. 1 and 2.

D is the lower yoke having an oil chamber $D^3$ which is adjustably secured to the bolts B, B, below the yoke C, by means of nuts $b'$, $b'$, as shown in the drawings.

Midway between the ends of the oil chamber $D^3$, is made a lateral wall $d$, which is cast integral with said oil chamber $D^3$, and has on its upper side a spherical recess D', similar to the recess C' in the upper yoke C for a purpose as will hereinafter be described. Through the lower portion of the wall $d$, is made a perforation $d'$ shown in Figs. 1 and 2 for the purpose of allowing the lubricant that accumulates in the bottom of said oil chamber to flow from one end of the latter to the other and to be drawn off through an end perforation $d''$ normally kept closed by a screw D'' or equivalent stop device as shown in Fig. 1.

E and F represent respectively the upper and lower bearings for the shaft G. The bearing E has on its upper side a spherical projection E' adapted to fit into the spherical recess C' on the yoke C; and the bearing F has on its under side a corresponding spherical projection F' adapted to fit into the spherical recess D' in the central wall $d$ of the oil chamber $D^3$ by which arrangement said bearings are universally journaled in the yokes C and D so as to prevent undue binding on the shaft in case the standard or hanger A should not be put up perfectly true relative to the position of the shaft. The lower bearing F is extended beyond the ends of the upper bearing E in the form of ears or flanges $f f$ having cut away portions $f'$ $f'$ adapted to serve as guides for the slitted expansive rings H H which are loosely suspended on the shaft G as shown in Figs. 1, 3, 4, and 5. Said rings being partially submerged in the oil contained in the chamber $D^3$ and caused to partake of the rotation of the shaft G, thus automatically causing the lubricant to be conveyed to the shaft and its bearings during the rotation of said shaft.

I I are yielding spring wipers secured within the chamber D and adapted to bear lightly against the shaft G outside of the rings H H for the purpose of automatically removing the surplus oil from the said shaft and causing it to be returned into the oil chamber $D^3$.

In devices of this kind it has been difficult to get easy access to the oiler rings in case they should become foul or stuck and needing subsequent cleaning, and such access was only possible by the removal of the upper bearing and the upper yoke by which it was held in place. This is very objectionable and time consuming and to obviate such difficulty I employ detachable end covers K K loosely supported on the ears $f, f$, of the lower bearing F and held in position preferably by pins $e, e$, on the upper bearing E received in perforated ears $k, k$, on said detachable end covers K K as fully shown in Figs. 1 and 3. By simply removing said end caps K the rings H are in sight and may be cleaned or detached from the shaft by expanding said slitted rings without the need of removing the top bearing E. Said caps also serve to prevent dust and dirt from getting into the oil receptacle $D^3$.

For the purpose of dispensing with set collars at the ends of the shaft I use in connection with this my improved bearing a detachable end piece L having a semi-circular or equivalent sleeve $l$, adapted to rest in a correspondingly shaped recess in the end of the oil chamber $D^3$ and preferably provided with a flange $l'$ in its outer end as shown in Figs. 1 and 3 so as to hold it in proper position relative to said oil chamber. Such end piece may easily be removed in case it is desired to extend the shaft beyond the improved bearing.

Having thus fully described the nature, construction, and operation of my invention, I wish to secure by Letters Patent and claim—

1. The herein described bearing consisting of the adjustable oil receptacle $D^3$, having perforated division wall $d$, and spherical recess $D'$ therein and adjustable yoke C having spherical recess $C'$ combined with the bearings E, F, having the respective spherical projections $E'$ $F'$ adapted to fit the spherical recesses $C'$ $D'$ substantially as and for the purpose set forth.

2. The herein described ring oiler bearing consisting of the adjustable oil receptacle $D^3$ having a perforated division wall $d$, and the adjustable yoke C, the upper bearing E universally journaled in the latter and the lower bearing F universally journaled in the oil receptacle $D^3$ and having end extensions $f, f$, with notches $f'$ $f'$ for the reception of the rings H H and said rings substantially as and for the purpose set forth.

3. The herein described ring oiler bearing consisting of universally journaled bearings E, F, the latter having notched end extensions $f, f$, provided with cut away portions and rings H, H, arranged therein and loosely supported on the shaft combined with detachable end caps K K substantially as and for the purpose set forth.

4. In a ring oiler bearing an oil receptacle and upper yoke and universally journaled bearings arranged therein combined with rings H H loosely supported on the shaft a detachable end piece L and detachable end caps K K substantially as and for the purpose set forth.

5. In a ring oiler bearing an oil receptacle, and bearings for the shaft arranged in connection therewith combined with rings H H loosely supported on the shaft and detachable end caps K K substantially as and for the purpose set forth.

In testimony whereof I have signed my name to this specification, in the presence of two subscribing witnesses, on this 20th day of March, A. D. 1894.

WILSON W. CAREY.

Witnesses:
ALBAN ANDRÉN,
KITTIE M. HANSON.